United States Patent Office 3,039,538
Patented June 19, 1962

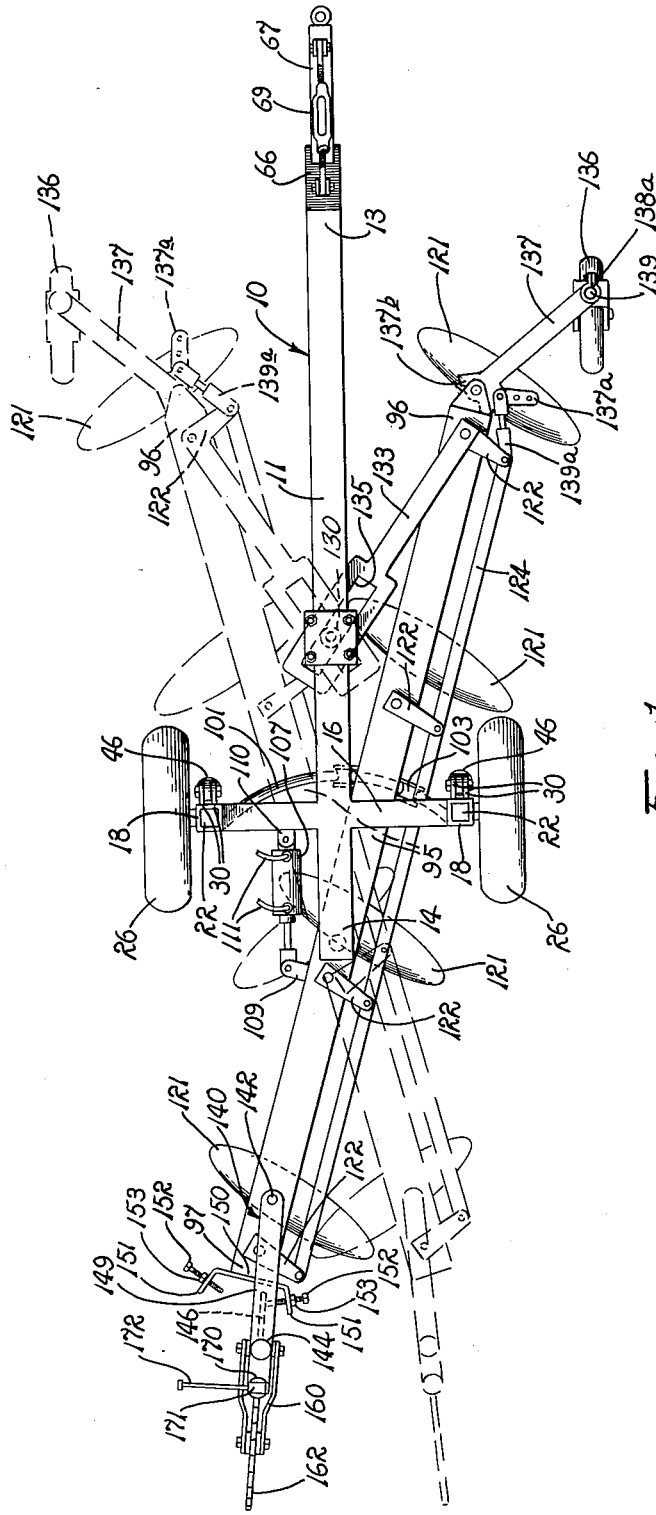

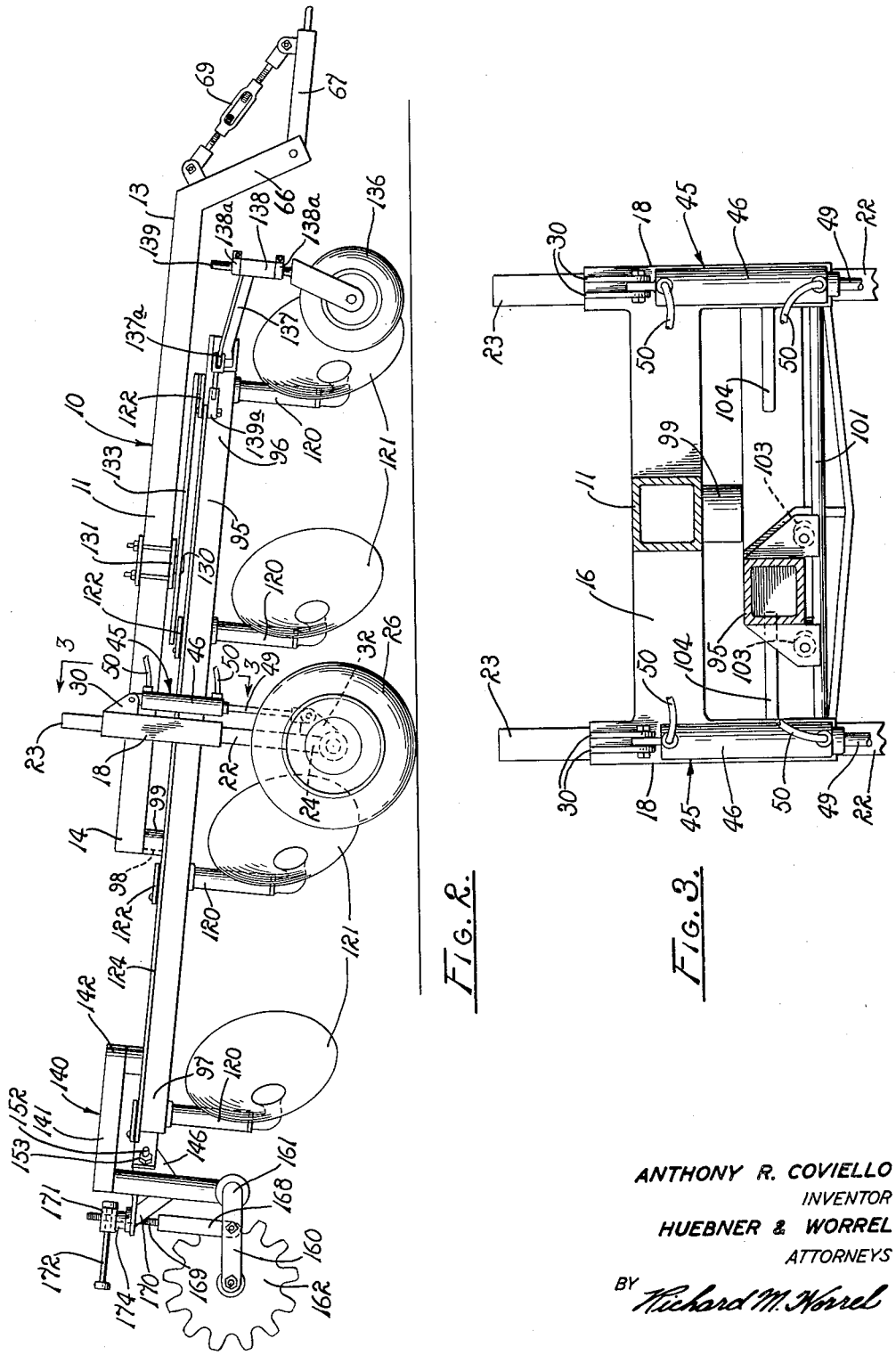

3,039,538
REVERSIBLE DISC PLOW
Anthony R. Coviello, Box 208, Tulare, Calif.
Filed Dec. 23, 1960, Ser. No. 77,964
10 Claims. (Cl. 172—212)

The present invention relates to a reversible disc plow and more particularly to such a plow having an improved depth control device. This application is a continuation-in-part of my co-pending application, Serial No. 782,274, entitled Reversible Disc Plow, filed December 22, 1958, now United States Patent No. 2,973,045.

Reversible disc plows normally have opposite, transversely angularly related, operational positions. Separate means are usually provided at opposite sides of the plow to regulate or limit depth of plow engagement with the soil. Such plows normally tend to dig in too deeply at their forward ends unless positively precluded from such action. Such forward digging is called "diving," and thus depth control or limiting means are typified in their use to avoid diving. For such purpose in plows which are towed, rather than tractor borne, it is customary to use a gage wheel at each side of the plow. Each is mounted for adjustable elevational movement in relation to the plow. When the plow is reversed so as to plow to its opposite side each wheel must be readjusted. When manual adjustment is provided, the tractor operator normally must leave the tractor at each instance of plow reversal to attend to the gage wheels. When automatic elevational control systems are provided for such gage wheels, the systems are not always dependable, they frequently are complex, and generally involve expense which it is desirable to avoid.

An object of the present invention is, therefore, to provide a reversible disc plow having improved depth control.

Another object is to provide such a disc plow having a single automatically controlled gage wheel which is effective to obviate diving action.

Another object is to provide a reversible disc plow capable of such reversal without manual adjustment of depth control means thereof.

Another object is to provide a reversible disc plow providing a depth control device which is automatically positioned concurrently with movement of the plow disc blades between their opposite operational positions.

Another object is to provide a reversible disc plow having a gage wheel at the forward end portion thereof which upon reversing of the plow is automatically positioned to engage the bottom of the previously formed dead furrow.

Other objects and advantages will become more clearly apparent in the subsequent description in the specification wherein elements common to both the present and the parent application are identified by the same reference numerals.

In the drawings:

FIG. 1 is a top plan view of a reversible disc plow embodying the principles of the present invention adjusted to discharge encountered earth laterally to the right of a line of travel.

FIG. 2 is a side elevation of the reversible plow of FIG. 1 illustrating the support frame and plow beam together with the disc plows in an elevated position with respect to the support wheels.

FIG. 3 is a somewhat enlarged, fragmentary, transverse, vertical section taken on line 3—3 of FIG. 2.

Referring more particularly to the drawings, a support frame preferably of box steel is generally indicated by the numeral 10 and is best understood by reference to FIGS. 1 and 2. The frame includes an elongated longitudinal member 11 having opposite forward and rearward end portions 13 and 14, respectively, and a transverse member 16 rigidly connected to the longitudinal member in adjacent spaced relation to its rearward end portion and in substantially right-angular relationship to the longitudinal member. The transverse member has opposite ends, and tubular sleeves 18, preferably having openings therethrough of rectangular or other polygonal cross section are rigidly connected to the opposite ends of the transverse member in substantially upright positions.

Elongated legs 22 are longitudinally slidably fitted in the sleeves 18 and have upper and lower ends 23 and 24. Ground engaging support wheels 26 are rotatably connected to the lower ends of the legs in coaxial relation to each other, on opposite sides of the longitudinal frame member 11, and in parallel planes substantially equally spaced from, and parallel to, a central vertical plane containing the longitudinal frame member. The upper ends of the legs extend upwardly from the sleeves.

Brackets 30 are rigidly secured to the sleeves 18 above the transverse frame member 16 in forwardly extended relation therefrom. Brackets 32 are rigidly secured to the lower ends 24 of the legs 22 in forwardly extending relation therefrom and in substantially the same plane as the brackets 30 on the sleeve 18. An hydraulic elevational control ram 45 provides a cylinder 46 rigidly mounted on the brackets 30, and a piston rod 49 rigidly connected to the brackets 32 on the legs 22. The ram has fluid hoses 50 adapted to deliver and remove fluid to and from the cylinder, as is well known in the art. The ram is extended so as to apply pressure downwardly on the legs 22 thereby to elevate the frame 10 on the support wheels 26. Conversely, when the ram is retracted, the frame is allowed to descend relative to the support wheels. Such movement is, of course, limited by the stroke of the rod 49 in the cylinder.

Elongated draft arms 66 are rigidly forwardly extended from the forward end portion 13 of the frame 10, and an elongated tongue 67 is pivotally connected to the arms by means of a pin 68 disposed transversely of the longitudinal frame member 11. A turn-buckle 69 pivotally interconnects the draft arms and the tongue for enabling adjustment in the angularity between the tongue and the arms. As described, it will be evident that the support wheels 26 mount the frame 10 for earth traversing movement in a predetermined line of travel coincident with the longitudinal frame member 11 and normal to the axis of rotation of the wheels 26.

An elongated plow beam 95, also preferably of box steel, provides a forward end 96, a rearward end 97, and is connected to the rearward end portion 14 of the frame 10 by means of an upright pivot bolt 98 intermediate the forward and rearward ends of the beam and so that the beam extends between the support wheels underneath the frame members 11 and 16. The pivot bolt is preferably nearer one end of the beam 95 than the other, in this instance being nearer the rearward end 97. A spacer 99 is interposed between the plow beam and the longitudinal frame member 11 of the frame. An elongated transverse rail 101 is rigidly mounted between the sleeves 18 underneath the longitudinal frame member. A pair of rollers 103 are rotatably mounted on the plow beam for rotation about an axis disposed longitudinally of the plow beam. The rollers rest on the rail for rolling engagement therewith. The beam is thus mounted for horizontal pivoting or swinging movement between opposite operational positions on opposite sides of the longitudinal frame member 11. The beam is adapted for engagement with stop bolts 104 rigidly mounted in inwardly extending relation on the sleeves 18 to limit the extent of movement of the beam at its opposite operational positions. The angles between the beam and the longitudinal frame member in the opposite operational positions of the beam are perferably substantially equal. Further, it is to be noted that the spacing between the support wheels 26 is less than the maximum distance between the opposite operational positions of the forward end 96 of the plow beam.

For swinging the beam 95 between its opposite positions, a beam control ram 107 pivotally interconnects the frame 10 and the plow beam. Specifically, a beam bracket 109 is rigidly connected to the plow beam rearwardly adjacent to the pivot bolt 98 and a frame bracket 110 is rigidly connected to the transverse frame member 16. The ram 107 includes a cylinder pivotally connected to the frame bracket and a pivot rod pivotally connected to the beam bracket. Hoses 111 are connected to the ram for conducting hydraulic fluid to and from the ram. Upon extension of the ram, the beam is pivoted in a counter clockwise direction, as viewed in FIG. 1, and upon retraction of the ram, the beam is pivoted in a clockwise direction, as viewed in FIG. 1.

A plurality of tool posts 120 are rotatably mounted in the beam 95 in substantially equally spaced relation and downwardly extended therefrom. It is to be noted that the spacing between adjacent tool posts is sufficient to accommodate the support wheels 26 therebetween. Thus, the innermost tool posts are spaced on opposite sides of the transverse frame member 16. A plow disc blade 121 is rotatably mounted on the lower end of each post for earth engagement. The blades 121 are spaced sufficiently to receive the wheels 26 therebetween. Plow control arms 122 are rigidly radially extended from the upper ends of the tool posts above the plow beam, and a rigid elongated push-pull bar 124 extends lengthwise of the plow beam and is pivotally connected to the plow control arms in radially spaced relation to the tool posts for correspondingly rotating the tool posts, and thus the blades, incident to longitudinal movement of the push-pull bar.

A camming roller 130 is mounted in upright position on and beneath the longitudinal frame member 11 between the transverse frame 16 and forward end portion 13 of the frame 10. The roller is mounted on a bracket 131 for adjustable movement longitudinally of the frame into predetermined positions on the frame member 11. An elongated plow positioning arm 133 is rigidly radially extended from the forwardmost tool post 120 in substantially right-angular relation to its respectively adjacent plow control arm 122. The plow positioning arm has an elongated longitudinally disposed slot 135 slidably receiving the roller and thus extending underneath the longitudinal frame member. When the ram 107 is operated to swing the plow beam 95 between its opposite operational positions, the plow positioning arm 133 rotates the blades 121 so that they discharge encountered earth laterally outwardly from the side of the frame 10 toward which the forward end of the plow beam is positioned. Thus, in FIG. 1, the blades discharge such earth laterally toward the right of the forward direction of travel of the frame. When the beam is in the opposite position, that is toward the left of the longitudinal frame member, the blades are adjusted so as to discharge earth laterally toward the left. In this respect, the operation of the plow is similar to that shown and described in my United States Patent No. 2,600,359.

The present invention further extends the above principle to a depth control gage wheel 136 which is mounted, to be similarly controlled, on the forward end 96 of the plow beam 95. This mounting provides a forwardly extended leg 137 which includes an inner end pivotally mounted on the forward end 96 of the beam and an outer extended end rearwardly spaced from the forwardly extended draft arm 66. The outer extended end of the leg includes an integral vertically disposed sleeve 138. The sleeve slidably receives a wheel supporting rod 139 which rotatbaly mounts the swivel depth gage wheel 136 for elevational adjustment relative to the plow beam 95. A pair of clamping members 138a are disposed about the rod 139 above and below the sleeve 138 to retain the wheel in its adjusted elevational position. A lever arm 137a is rigidly connected to the leg adjacent to its inner end on the plow beam which provides an adjustable mounting for an adjustable link 139a pivotally connecting the leg with the forwardmost control arm 122. In addition to the adjustability of the link 139a, the lever provides a plurality of suitable apertures therein for connecting the link whereby the leg and the disc control wheel 136 can be accurately positioned angularly outwardly from the plow beam 95. In this manner, as the plow beam is swung between its opposite operational positions, the plow positioning arm 133 not only rotates the blades 121 but is also operable to rotate the leg 137 and the disc control wheel 136 so that the wheel will project angularly outwardly from the plow beam in either of its operational positions. The lever further serves as a stop, as viewed in FIG. 1 abutting the forward end 96 of the beam 95, to prevent bending of the push-pull bar 124 and its connecting linkage. Such bending is prevented in the opposite operational position of the plow beam by a stop bracket 137b mounted on the inner end of the leg 137 opposite to the lever 137a.

A tail wheel bracket 140 includes a beam connecting member 141 mounted on the rear end 97 of the beam 95 by means of a pivot bolt 142 for swinging movement in a plane parallel to the beam. The tail wheel bracket also has a wheel mounting portion 144 downwardly extended from the beam portion rearwardly of the rear end of the plow beam. A stop plate 146 is connected to the portions of the wheel bracket within the acute angle defined therebetween and is also located in rearwardly spaced relation to the plow beam.

A U-shaped holder 150 provides a central portion connected to the rear end 97 of the plow beam 95 and a pair of rearwardly outwardly angularly extended ears 151 disposed on opposite sides of the stop plate 146. Stop bolts 152 are screw-threaded inwardly through the ears, and jamb nuts 153 are turned on the bolts for tightening against the ears. The tail wheel bracket is thus mounted for free swinging movement toward the opposite sides of the beam by engagement of the stop bolts with the stop plate. Thus, extent of movement of the bracket can be adjusted with the bolts 152.

A yoke 160 is pivotally connected by means of a pin 161 to the wheel portion 144 of the tail wheel bracket 140 and extends rearwardly therefrom. A tail wheel 162 is rotatably mounted on the yoke and is adapted for ground engagement upon lowering of the frame 10 relative to the ground support wheels 26. Of course, the tail wheel is mounted for swinging movement relative to the plow beam 95 by the described tail wheel bracket.

A shank 168 is pivotally connected to the yoke 160 rearwardly of the pin 161, and a screw 169 is upwardly extended from the shank and extended through a bracket 170 rigidly rearwardly mounted on the wheel portion 144 of the tail wheel bracket 140. A collar 171 circumscribes the screw, and a handle 172 is longitudinally slidably diametrically extended through the collar and the screw. A nut 174 is interposed between the collar and the bracket, is screw-threaded on the screw, and is rigid with the bracket. By rotating the handle, it will be evident that the elevational position of the tail wheel 162 can be adjusted by threading the screw up and down on the nut.

*Operation*

The operation of the described embodiment of the subject invention is believed to be readily apparent and is briefly summarized at this point. The plow beam control ram 107 is either expanded or retracted to position the plow beam 95 on the desired side of the frame 10.

The plow beam is limited in its maximum outward swing by engagement with the respectively adjacent stops 104 and is held in this position by locking the ram 107 and/or by earth engagement. As stated above, the blades 121 are angled by the plow positioning arm 133 so as to discharge encountered earth laterally outwardly of the frame and the plow beam. It is to be observed that the blades are so positioned and spaced on the beam in reference to the support wheels 26 that during swinging movement of the beam between its opposite operational positions, the adjacent blades on opposite sides of the support wheels move in arcuate paths extending forwardly and rearwardly of the support wheels and without interference or contact with the support wheels.

During such swinging movement of the beam, it is further observed that the disc control wheel 136 also moves in an arcuate path rearwardly of the draft arm 66. When the plow beam 95 reaches either of its operational positions, the depth gage control wheel 136 is adjusted by the link 139a and the lever arm 137a to engage the dead furrow of the previously plowed area. When properly adjusted, reverse positioning of the beam automatically positions the control wheel to roll in the previous dead furrow and limit downward movement or diving of the forward end of the plow to proper operational position. It is to be noted, however, that the gage control wheel is utilized during plowing or standing and not for non-plowing travel.

It is to be understood that the axis of the support wheels 26 extends approximately through the center of gravity or balance of the plow. Accordingly, the plow is easy to connect to, or disconnect from, a tractor, not shown, by means of the tongue 67. The clamps 138a on the depth wheel supporting rod 139 are then loosened elevationally to adjust the gage wheel. When the gage wheel is lowered to the predetermined position limiting the depth of earth engagement of the forward blade 121 the clamps are tightened.

The elevational control ram 45 is then contracted to lower the support frame 10 on the support wheels 26 thereby to bring the blades 121 and tail wheel 162 into earth engagement. It is sometimes necessary further to adjust the elevational position of the tail wheel by manipulation of the handle 172. Also the elevational adjustment of the wheel 136 may be further regulated, if desired. The ram 45 locks the beam 95 in predetermined overall elevational position during operation of the plow. The plow is then drawn in earth traversing movement, as desired.

To reverse the operation of the plow, as in reciprocal travel thereof across a field in contour plowing or otherwise to plow a field with a common direction of soil movement, the rams 45 are expanded to lift the blades 121, tail wheel 162 and gage wheel 136 from soil engagement, the ram 107 is actuated reversely to angle the beam 95, and the rams 45 are then contracted to lower the blades 121, tail wheel 162 and gage wheel 136 into soil engagement.

During reversal of the plow beam from the position shown in FIG. 1 to the opposite side of the frame for left hand plowing, the arm 133 pivots in a counter-clockwise direction, as viewed. This moves the bar 124 forwardly oppositely to angle the plow blades 121 and tail wheel 162 so that the tail wheel resists lateral thrust of the blades during subsequent operation. This operation is described in greater detail in the parent application and is not further reviewed at this point. However, at the same time the forward movement of the bar thrusts the link 139a forwardly, shoves the arm 137a in a counter-clockwise direction, as viewed, and pivots the leg 137 to the position shown in dashed lines in FIG. 1. So positioned, the wheel 136 is arranged to roll along the bottom of the previous dead furrow. Upon return of the plow beam to the position shown in full line in FIG. 1, the link 139a pulls the arm 137a in a clockwise direction and returns the gage wheel to its position for right hand plowing.

It has been found that the described automatic system for re-positioning the gage wheel in response to beam movement is thoroughly dependable and achieves improved depth control. It is simple, economical and light in weight.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a reversible disc plow adapted for earth traversing movement along a predetermined line of travel and having an elongated frame; a plow beam having forward and rearward ends and being pivotally mounted on the frame for horizontal transverse swinging movement relative thereto, said plow beam having a plurality of disc blades mounted thereon; a depth control gage wheel pivotally mounted on said forward end of the plow beam for movement therewith relative to the frame; and means connected to the gage wheel responsive to pivotal movement of the beam relative to the frame automatically pivotally positioning the gage wheel on the beam and maintaining said gage wheel parallel to said line of travel during earth traversing movement of the plow.

2. In a reversible disc plow adapted for earth traversing movement along a predetermined line of travel and having an elongated frame; a plow beam having forward and rearward ends and being pivotally mounted on the frame for horizintal transverse swinging movement relative thereto, said plow beam having a plurality of ground engageable disc blades swivelly mounted thereon; motion transmitting means interconnecting said disc blades and the frame whereby the discs are swivelly positioned incident to said swinging movement of the plow beam; and a ground engageable depth control gage wheel pivotally mounted on the forward end of the plow beam for limiting ground penetration of said disc blades, said depth control gage wheel being connected to said motion transmitting means whereby the gage wheel is pivoted relative to the plow beam incident to said swinging movement of the plow beam and is rotated during ground engagement in a plane parallel to said predetermined line of travel.

3. A reversible disc plow comprising a mobile frame, a beam having opposite forward and rearward ends and being mounted in the frame for horizontal pivotal movement between opposite predetermined operational positions, a plurality of disc blades, means mounting the disc blades on the beam for adjustable rotational positioning about substantially erect axes spaced longitudinally of the beam, an endwardly reciprocal push-pull member disposed substantially parallel to the beam interconnecting the blade mounting means for corresponding adjustable positioning of the blades, an arm mounted on the forward end of the beam for substantially horizontal pivotal movement and extended therefrom, a lever rigidly extended from the arm adjacent to an end of the push-pull member, a link pivotally interconnecting the lever and the push-pull member, and a gage wheel mounted on the extended end of the arm.

4. A reversible disc plow comprising a mobile frame, a beam having forward and rearward ends mounted in the frame for horizontal pivotal movement between opposite predetermined operational positions, a plurality of disc blades, means mounting the disc blades on the beam for adjustable rotational positioning about substantially erect axes spaced longitudinally of the beam, an endwardly reciprocal push-pull member disposed longitudinally along a side of the beam interconnecting the blade mounting means for corresponding adjustable positioning of the blades, an arm mounted on the forward end of the beam for substantially horizontal pivotal movement and extended forwardly therefrom, a lever rigidly extended from the arm adjacent to the push-pull member, a link pivotally interconnecting the lever and the push-pull member, and a gage wheel swivelly mounted on the extended end of the arm for earth engagement.

5. In a reversible disc plow including an elongated frame having opposite sides and adapted for earth traversing movement along the predetermined line of travel; a beam having forward and rearward ends and being pivotally mounted on the frame for horizontal transverse swinging movement relative thereto between opposite operational positions at opposite sides of the frame, a plurality of ground engageable disc blades swivelly mounted on the beam; motion transmitting means interconnecting said disc blades and the frame whereby the discs are swivelly positioned incident to said swinging movement of the plow beam; an arm mounted on the forward end of the beam for substantially horizontal pivotal movement and extended therefrom, a lever rigidly extended from the arm adjacent to the motion transmitting means, a link pivotally interconnecting the lever and the motion transmitting means, and a gage wheel mounted on the extended end of the arm for alternative positions of earth engagement on opposite sides of the frame incident to said swinging movement of the plow beam and mounted for rotation in respective planes parallel to said line of travel in either of said positions.

6. In a reversible disc plow including an elongated frame having opposite sides; a plow beam having forward and rearward ends, said plow beam being pivotally mounted adjacent to its rearward end on the frame for swinging movement of its forward end in a transverse horizontal plane between opposite operational positions spaced outwardly from said opposite sides of the frame; a plurality of disc blades swivelly mounted on the plow beam; motion transmitting means interconnecting said disc blades and the frame whereby the discs are swivelly positioned incident to said swinging movement of the plow beam; and a ground engageable depth control gage wheel pivotally mounted on the forward end of the plow beam for movement therewith during said positioning between the opposite operational positions of the beam, and said wheel being connected to said motion transmitting means whereby the wheel is disposed outwardly from said forward end of the beam at said opposite operational positions on opposite sides of the frame.

7. In a reversible disc plow including an elongated frame having opposite sides; a plow beam having forward and rearward ends, said plow beam being pivotally mounted adjacent to its rearward end on the frame for swinging of its forward end in a transverse horizontal plane between opposite operational positions spaced outwardly from said opposite sides of the frame; a plurality of disc blades pivotally mounted on the plow beam; motion transmitting means interconnecting said disc blades and the frame whereby the discs are pivotally positioned incident to said swinging movement of the plow beam; a forwardly extended leg pivotally mounted on the forward end of the beam, said leg including an integral lever providing an adjustable connection between the leg and said motion transmitting means; and a ground engageable depth control gage wheel rotatably, vertically adjustably mounted on said leg for limiting ground penetration of the disc blades, said leg automatically positioning the wheel forwardly outwardly from the forward end of the beam at said opposite operational positions on opposite sides of the frame, and said lever providing further adjustment of the wheel towards and from the frame in such operational positions.

8. A reversible disc plow comprising an elongated frame having predetermined forward and rearward end portions and opposite sides; means mounted on the forward end portion of the frame adapted to connect the frame to a draft appliance; a beam pivotally mounted in the rearward end portion of the frame and forwardly extended therefrom for adjustment between opposite operational positions at opposite sides of the frame; a plurality of reversible disc blades mounted in substantially equally spaced relation along the beam; a pair of axially aligned ground engaging support wheels mounted on the frame on a common axis extended transversely of the frame between adjacent blades and on opposite sides of the beam, means connected to the beam for adjustably positioning the beam in the frame between its opposite operational positions; and depth control means mounted on said beam in forwardly spaced relation to said pivotal mounting of the beam in the frame for limiting the depth of earth engagement of said disc blades in the ground.

9. In a reversible disc plow, an elongated longitudinal frame member having a forward end adapted for connection to a draft appliance and a rear end; a transverse frame member rigidly connected in normal relation to the longitudinal member in forwardly adjacent spaced relation to said rear end; ground support wheels individually mounted on the transverse member on opposite sides of the longitudinal member for rotation in upright planes substantially parallel to the longitudinal member and on a common axis in a substantially common upright plane with the transverse member, said common plane being substantially normal to the longitudinal member; an elongated plow beam extended under the frame members between the support wheels and having front and rear ends respectively extended forwardly and rearwardly of the rear end of the longitudinal member; means supported by the longitudinal member rearwardly of said common axis pivotally mounting the beam intermediate its ends for horizontal swinging movement between opposite operational positions on opposite sides of the longitudinal member; a plurality of reversible disc blades mounted in the beam, the plow having a center of balance intermediate the ends of the longitudinal member substantially in said common plane whereby said plow is substantially longitudinally balanced on the support wheels; and a depth control gage wheel pivotally mounted on the front end of the beam for horizontal swinging movement therewith between said opposite operational positions.

10. A reversible disc plow comprising an elongated frame having predetermined forward and rearward end portions and opposite sides; means mounted on the forward end portion of the frame adapted to connect the frame to a draft appliance; a beam pivotally mounted in the rearward end portion of the frame and forwardly extended therefrom for adjustment between opposite operational positions at opposite sides of the frame; a plurality of reversible disc blades mounted in substantially equally spaced relation along the beam; there being a forwardmost disc blade movable between pretedermined maximum spaced positions spaced transversely of each other with respect to the frame incident to movement of the beam between opposite operational positions; a pair of axially aligned ground engaging support wheels mounted on the frame having a common axis extended transversely of the frame between adjacent blades and on opposite sides of the beam, each of the support wheels being spaced a distance transversely of the frame less than the maximum predetermined spaced position of the forwardmost blades on its respective side of the frame; means connected to the beam for adjustably positioning the beam in the frame between its opposite operational positions; and a depth control gage wheel pivotally mounted on the beam extending forwardly angularly outwardly therefrom at both of said opposite operational positions of the beam.

References Cited in the file of this patent

UNITED STATES PATENTS

| | | |
|---|---|---|
| 623,673 | Kavanagh | Apr. 25, 1899 |
| 954,950 | Fowler | Apr. 12, 1910 |
| 2,546,554 | McElroy | Mar. 27, 1951 |
| 2,648,267 | Pursche | Aug. 11, 1953 |
| 2,672,801 | Barrett | Mar. 23, 1954 |

FOREIGN PATENTS

| | | |
|---|---|---|
| 4,453 | Great Britain | of 1875 |